(No Model.) 2 Sheets—Sheet 1.
F. ORR.
GRAIN METER.
No. 442,134. Patented Dec. 9, 1890.
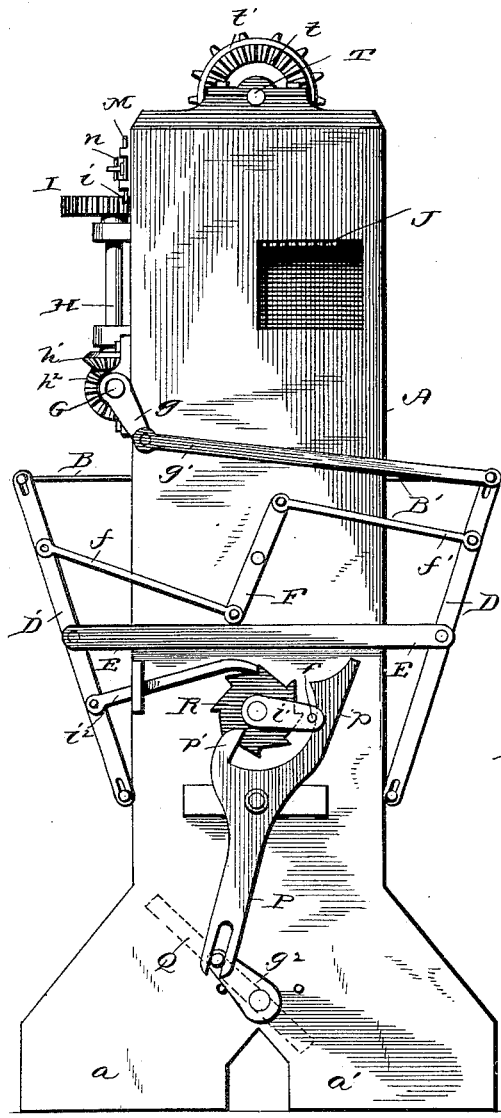
Witnesses
Inventor
Frank Orr
By his Attorney
Franklin H. Hough (No Model.) 2 Sheets—Sheet 2.

F. ORR.
GRAIN METER.

No. 442,134. Patented Dec. 9, 1890.

Witnesses
Inventor
Frank Orr,
By his Attorney
Franklin H. Hough

UNITED STATES PATENT OFFICE.

FRANK ORR, OF EAST SPRINGFIELD, OHIO.

GRAIN-METER.

SPECIFICATION forming part of Letters Patent No. 442,134, dated December 9, 1890.

Application filed July 5, 1890. Serial No. 357,852. (No model.)

*To all whom it may concern:*

Be it known that I, FRANK ORR, a citizen of the United States, residing at East Springfield, in the county of Jefferson and State of Ohio, have invented certain new and useful Improvements in Grain-Meters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to grain measures or tallies, and has for its object to automatically measure the grain, record the amount measured, and shift the grain as it emerges from the device to one or the other of two discharge-spouts, whereby when the grain is discharging through one spout the sack which has been previously filled can be removed and replaced by an empty sack.

Another object of my invention is to provide a simple mechanism which will be positive and efficient in its action, and which will cut off the grain from the measuring-chamber at the instant the valves are opened to permit the discharge of the grain from the said measuring-chamber.

A further object of the invention is to improve the general construction of this class of machines, whereby their efficiency is increased, the mechanism simplified, and the parts rendered less liable to disarrangement.

The improvement consists, essentially, of the novel construction and arrangement of the parts, which will be hereinafter more fully described and claimed, and which will be shown in the annexed drawings, in which—

Figure 3:
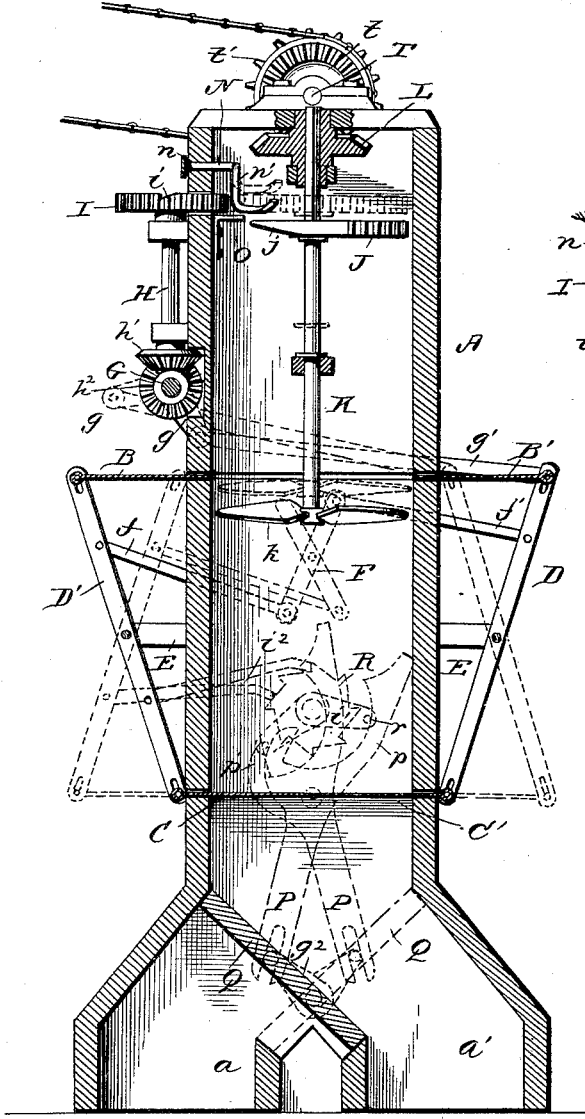
Figure 4:
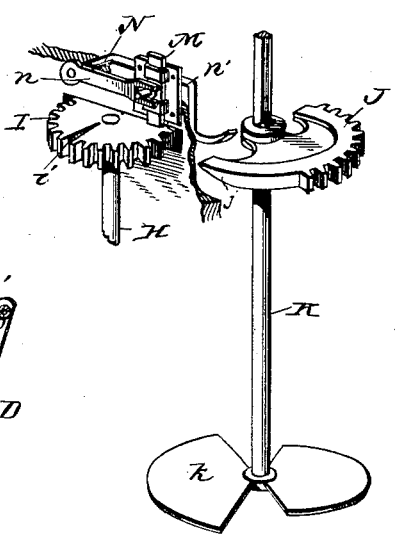

Figure 1 is a side view of a grain measure or tally embodying my invention, showing the operation of the gate which closes one or the other of the discharge-spouts by dotted lines. Fig. 2 is a reverse side view of the machine. Fig. 3 is a vertical section through the entire measure, showing the operation of the cut-offs and valves by dotted lines. Fig. 4 is a detail perspective view of the locking and trip mechanism for the power-transmitting shaft.

The case A is provided at its lower end with the discharge-pipes $a$ and $a'$ and is adapted to receive the grain to be measured at its upper end. The cut-offs B and B' and the valves C and C' are pivotally connected with the opposite ends of the lever-sections D and D' and work through suitable slits in the diametrically-opposite sides of the case. Each of the lever-sections is composed of two members, between which the cut-off and valves are arranged, and which are pivotally supported midway of their ends on the bars E, which are secured transversely to the case. The equalizing-levers F, pivotally supported between their ends on the case, have their opposite ends connected with the lever-sections D and D' by the links $f$ and $f'$, which serve to transmit the motion from one lever-section to the other. The horizontal shaft G is provided at its ends with cranks $g$, which are connected with the lever-section D by the links $g'$. The short vertical shaft H, journaled on a side of the case near the upper end thereof, is provided near its lower end with a bevel-pinion $h'$, which meshes with a corresponding pinion $h^2$ on the shaft G, and with a gear-wheel I at its upper end, which is sufficiently large to extend through a slot in the side of the case and be engaged by the mutilated gear-wheel J, which is secured on the auger-shaft K, which is centrally journaled in the case. The auger-shaft projects a short distance into the measuring-chamber below the cut-offs B and B', and has the auger-blade $k$ secured on its lower end. The upper end of the auger-shaft is made angular and passes through a corresponding opening in the hub of the gear-wheel L, so as to turn therewith. This auger-shaft is adapted to have a limited vertical movement to release the gear-wheel I and bring the mutilated gear-wheel J in the plane of the gear-wheel I to effect an opening of the valves C and C' and a closing of the cut-offs B and B' at the proper time. The locking-bolt M is adapted to engage with notches $i$ in the upper side of the gear-wheel I and prevent the same from turning forward too far when the valves are closed and from any motion during the filling of the measuring-chamber. The shaft N is provided at its outer end with the arm $n$, which is in engagement with the said locking-bolt M at its outer end. The trip-arm $n'$ at the inner end of the shaft N projects within the path of the mutilated gear-wheel J, and is engaged with the same at the proper time to disengage the lock-bolt from the gear-wheel I. The stop O, arranged below the inner end of the gear-wheel I, supports the mutilated gear-wheel J when in engagement with the said gear-wheel I.

The lever P, pivoted between its ends, has its lower end in engagement with the crank $g^2$ on the journals of the pivoted gate Q. The upper end of the lever is provided with two extensions $p$ and $p'$. The extension $p$ is curved on its inner edge and the extension $p'$ is straight. The ratchet-wheel R, concentrically journaled with the curved extension $p$, has a pin $r$ projecting laterally from an arm $i'$ thereof to engage with the extensions $p$ and $p'$ for the purpose of operating the gate Q to close either one of the discharge-spouts $a\ a'$. This ratchet-wheel is actuated by the pawl $i^2$, which is connected at its outer end with the lever-section D'.

The registering device, which may be of any suitable construction, is shown as comprising the ratchet-disks S and S', which are adapted to intermesh, the ratchet-disk S being operated from the lever-section D' by the pawl $s$.

The operation of the invention is as follows: The gear-wheel L is continuously rotated from any suitable part of the thrashing-machine or elevator to which the measure may be attached, preferably by the counter-shaft T, which is provided at its inner end with the gear-wheel $t$, which is in mesh with the gear-wheel L, and at its outer end with the sprocket-wheel $t'$, around which a sprocket-chain passes at one end, the said chain passing around a corresponding sprocket-wheel around the shaft from which the power is taken. The rotation of the gear-wheel L causes the auger-shaft K to revolve therewith, and when the measuring-chamber, which is comprised between the cut-offs B and B' and the valves C and C', is nearly filled the auger-blade rises with the grain, and when the chamber is filled causes the mutilated gear-wheel J to mesh with the gear-wheel I, and through the connections hereinbefore specified effects a closing of the cut-offs B and B' and a corresponding opening of the valves C and C'. The mutilated gear-wheel remains in mesh with the gear-wheel I sufficiently long to effect an opening of the valves and a closing of the cut-offs and again to close the valves and open the cut-offs. As soon as the cut-offs are again opened the mutilated gear-wheel J leaves the stop O and drops out of the plane of the gear-wheel I. It will be observed that the front or advancing end of the mutilated gear-wheel J is provided with a cam-shaped finger $j$, which engages with the trip-arm $n'$ and effects a disengagement of the bolt M from the gear-wheel I a few seconds prior to the meshing of the teeth on said mutilated gear-wheel J with the teeth on the gear-wheel I. As the valves close the registering device will be actuated to register the grain just measured, and the ratchet-wheel R will be moved forward the distance of one tooth, and after a certain number of measurements—say four—the pin $r$ will engage with the curved extension $p$ and reverse the position of the gate Q and close the discharge-spout $a$, and after the said ratchet-wheel has moved forward a like distance the said pin $r$ will engage with the straight extension $p'$ and again change the position of the gate Q so as to close the grain-spout $a'$.

Having thus described my invention, what I claim to be new is—

1. In a grain-measure, the combination, with the shaft having the gear-wheel I and the locking-bolt adapted to hold the said gear-wheel against rotation, of the trip-arm having connection with the said locking-bolt, the auger-shaft provided with blades, as described, the valves C and C', the measuring-chamber, and the mutilated gear-wheel on the said auger-shaft, provided with the cam-finger to effect a disengagement of the locking-bolt from the said gear-wheel prior to the meshing of the teeth on the gear-wheels I and J, substantially as set forth.

2. In a grain-measure, the combination, with the gear-wheel I, the cut-offs and valves, and connections between the said gear-wheels and the cut-offs and valves, the continuously-rotated auger-shaft, and the mutilated gear-wheel on the said auger-shaft, of the stop O, adapted to support the mutilated gear-wheel while the same is in engagement with the gear-wheel I, substantially as set forth.

3. In a grain-measure, the combination, with the case having discharge-spouts, as $a$ and $a'$, and the pivoted gate, of the lever P, having the curved and straight extensions $p$ and $p'$, respectively, and the ratchet-wheel provided with pin $r$, which is adapted to engage with the extensions $p$ and $p'$ alternately and change the position of the gate Q, substantially as set forth.

4. A grain-measure comprising the following elements: a case provided with discharge-spouts, cut-offs, and valves, between which are formed the measuring-chambers, pivoted lever-sections connected to operate together and having the cut-offs and valves at their opposite ends, a shaft, as G, connected with one of the lever-sections, the shaft H, geared with shaft G and having the gear-wheel I keyed therewith, the locking-bolt adapted to engage with gear-wheel I, the trip-arm $n$, connected with the said locking-bolt, the vertically-movable auger-shaft, means for rotating the said auger-shaft, the mutilated gear-wheel J on the said auger-shaft, having the cam-finger $j$, the stop O for supporting gear-wheel J when the same is in mesh with the gear-wheel I, the pivoted gate Q, the lever P, having engagement with and adapted to operate the said gate Q, and having the curved and straight extensions $p$ and $p'$, respectively, the ratchet-wheel R, having pin $r$, the pawl $r^2$, connected with one of the lever-sections, the registering mechanism, and the pawl $s$, connected with one of the lever-sections and adapted to actuate the said registering mechanism, substantially as set forth.

In testimony whereof I affix my signature in presence of two witnesses.

FRANK ORR.

Witnesses:
 A. B. JOHNSTON,
 J. I. CARROLL.